W. HAMILTON
Attaching Hubs to Axles.
No. 34,490.    Patented Feb. 25, 1862.
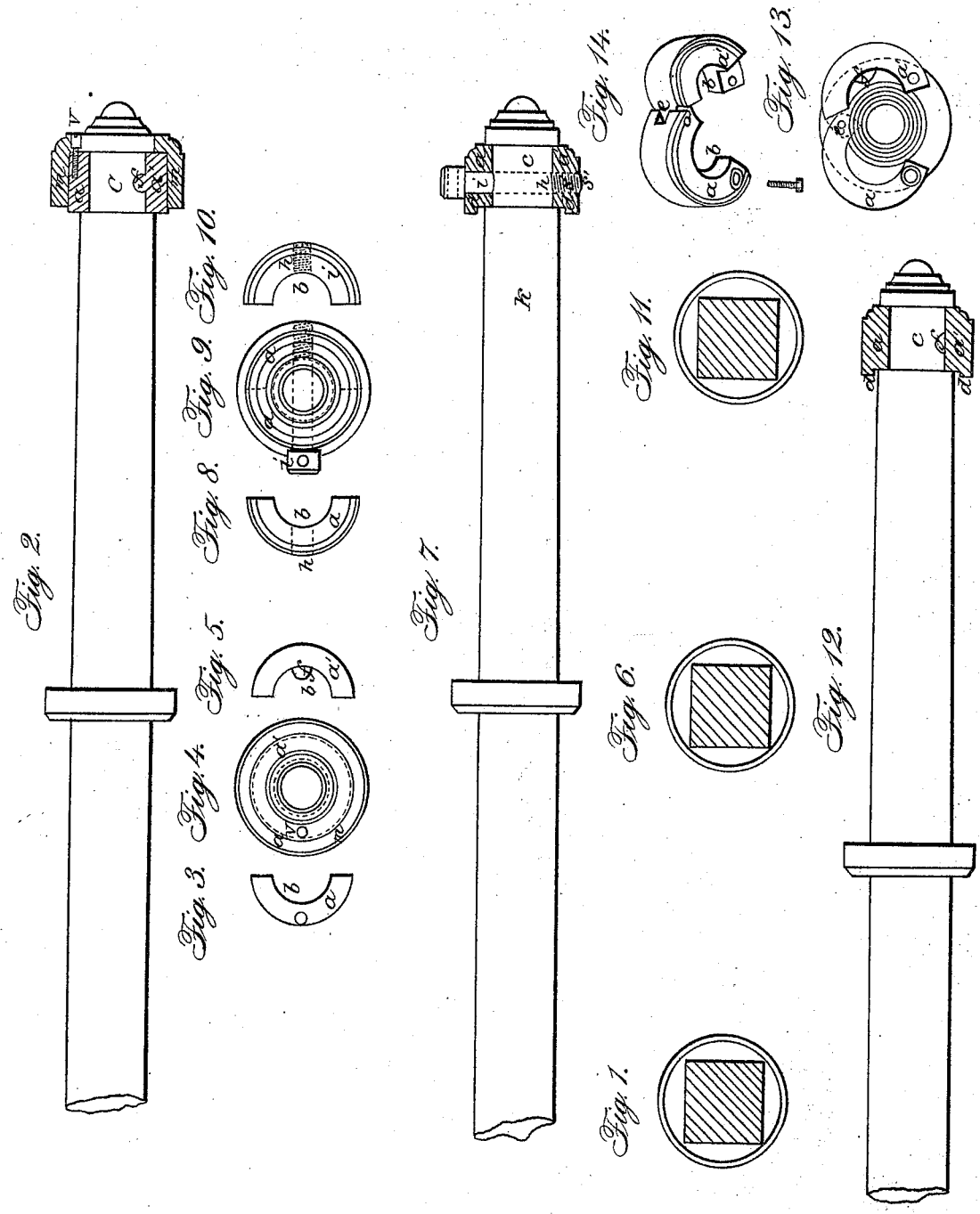

UNITED STATES PATENT OFFICE.

WILLIAM HAMILTON, OF WEST PITTSBURG, PENNSYLVANIA.

IMPROVEMENT IN MODE OF SECURING WHEELS TO AXLES.

Specification forming part of Letters Patent No. 34,490, dated February 25, 1862.

*To all whom it may concern:*

Be it known that I, WILLIAM HAMILTON, of West Pittsburg, in the county of Allegheny and State of Pennsylvania, have invented a new and useful Improvement in the Mode of Securing Wheels to Axles; and I do hereby declare the following to be a full, clear, and exact description thereof, reference being had to the annexed drawings, forming part of this specification, in which—

Figures 1, 6, and 11 are cross-sections of a carriage-axle. Fig. 2 is a side view of a carriage-axle, showing my improved safety-nut in section and the mode of securing it with a cap. Figs. 3 and 5 are the sectors or parts of the divided nut. Fig. 4 is an end view of the spindle with nut and cap. Fig. 7 is a side view of a carriage-axle, showing my improved safety-nut in section secured in place by a bolt. Figs. 8 and 10 are the sectors or parts of the divided nut. Fig. 9 is an end view of the spindle and nut, showing the bolt in place by dotted lines. Fig. 12 is a side view of a carriage-axle, showing my improved safety-nut as secured by attaching the sectors of the nut to each other. Fig. 13 is an end view of the spindle, showing the nut opened to be inserted or removed. Fig. 14 is a perspective view of the nut as hinged together and opened to be applied to the spindle.

Like letters of reference denote similar parts in the several figures.

My invention consists in an improvement in the mode of securing wheels to carriage or other axles by means of a nut composed of two or more sectors of a metallic ring so placed together and secured in a suitable groove near the end of the spindle as to fill up the entire circumference of the groove without being attached to the hub or pipe-box of the wheel.

To enable others skilled in the art to construct and use my improvement, I will proceed to describe its construction and the mode of applying it.

Among the various substitutes which have been invented for the old-fashioned linchpin for securing wheels to axles there are none, so far as I know, which are not liable to the objections of liability to self-detachment on the one hand or of want of simplicity of construction on the other. The various modifications of the screw-nut are all liable to become loose and to drop off, while the more complicated fastenings which operate with springs or catches are apt to become deranged and are difficult to attach and remove. My invention is designed to supply this want and to furnish a mode of securing wheels to axles which shall be more safe, easily kept in order, conveniently operated, and which shall give a good finish to the wheel.

My improved fastening for axles consists of a nut not having any screw cut in its bore, but made of two or more pieces or sectors of an annulus or ring, which are made to fit in a corresponding groove near the extremity of the spindle of the axle. These sectors, which when placed together in the groove in the axle form a perfect nut, are kept in place in any convenient manner, either by fastening them to each other or to the axle, so as to prevent their escaping from the groove, and in such manner as that the nut shall not revolve on the axle, not being attached either to the hub or pipe-box of the wheel. This is a matter of importance, because in those axle-fastenings where the nut or fastening is connected with the hub or wheel in any way it will wear away the spindle in the groove and become itself worn, which will cause the wheel to rattle. It is also important that the nut should fill up the entire circumference of the groove, so as to give a better bearing for the wheel.

In the several figures, $a\ a'$ are the sectors or pieces of the annulus forming the nut. They are made of iron or other suitable material. These pieces or sectors may be two or three in number, or even more, if desired; but probably two pieces will answer best. When placed together, they have a central bore $b$, corresponding in diameter with the spindle in the groove $c$. The thickness of these sectors at the central bore is equal to the width of the groove $c$, so that they will fit closely in it and leave no play which might cause an unpleasant rattling. These sectors may be thicker at the circumference of the nut and for some distance toward the center than the width of the groove, so as to cause a rabbet or recess all around the central bore of the nut, which allows the collar of the box of the wheel to enter. This rabbet is seen at $d$ in Figs. 7 and 12. The circumference of the nut formed of these sectors may be round or polygonal, as may be preferred. The groove $c$ in the spindle is made to fit the central bore of the nut, as before described. It need not be deep, lest the spindle should be unnecessarily weakened.

When the wheel is placed upon the spindle of the axle, the inner edge of the groove $c$ should be in the same plane as the face of the box of the wheel, or nearly so, allowing only sufficient play to give the requisite freedom of rotation. The collar around the bore of the box of the wheel projecting beyond its face enters the rabbet $d$ in the nut, (composed of the sectors $a\ a'$, &c.,) and thus keeps the spindle clear of dirt, &c. The nut is placed in the groove of the spindle, one piece being first inserted and the other (or others if there be more than two) fitted onto it.

The nut, being composed of two or more pieces, needs to be held in place either by attaching the sectional pieces to each other or to the spindle of the axle, or by confining them so that they shall not spread apart. This may be accomplished in various ways, some of which I will proceed to describe.

First. They may be attached to each other, as in Figs. 12, 13, and 14, where the nut is composed of two half-rings or annular sectors $a$ and $a'$, which are hinged together at one end, as at $e$, Figs. 13 and 14, and at the other end each piece laps over the other sufficiently far to receive a screw $s$ through the overlapping ends, by which they are held firmly together. The screw $s$ is inserted on the outer face of the nut and does not pass quite through it, but takes into the piece $a'$. To prevent the nut turning round in the groove $c$, which might cause it to work loose, a button or projection $f$ may be made on the face of the bore of the nut on one of the pieces $a$ and a corresponding indentation be made in the groove of the spindle. When this mode of attachment is used, the nut is removed by taking out the small screw $s$ and opening the pieces $a$ and $a'$. This mode of attaching the pieces may be inconvenient where there is not much room between the spindle and the hub-band, in which case it may be more convenient to adopt either of the following plans.

Second. The sectional pieces of the nut may be attached to the spindle, as in Fig. 7, where a hole $h$ is bored through the two pieces $a$ and $a'$ and through the spindle $k$ at right angles to its axis, and a small bolt $i$, with a head at one end and a screw $s'$ at the other, is passed through the hole and held fast by screwing into one of the sectoral pieces $a'$, which has a female screw cut in the hole $h$ for that purpose;

Third. The pieces composing the nut may be held *in situ* in the groove by means of a cap $m$, which is placed over the end of the spindle, and which incloses the sectoral pieces, fitting closely to their sides. This cap is fastened by a screw $v$ to one of the sectoral pieces $a$, and the cap and nut are prevented from turning on the spindle, as before described, by a button $f$ on the nut and a depression in the groove of the spindle, as in Fig. 2, or vice versa, a button on the spindle and a depression in the nut.

The mode of holding the sectoral pieces of the nut in place may be varied to suit the taste or convenience of the person using my improved mode of securing nuts to axles.

Having thus described my improvement, what I claim as my invention is—

The use of a nut for securing wheels to axles, composed of two or more sections of a metallic ring fitting into a groove in the axle in such manner as to fill the entire circumference of the groove, the sections of the nut being united and held in place independently of and detached from the pipe-box or hub of the wheel, substantially in the manner and for the purpose hereinbefore described.

In testimony whereof the said WILLIAM HAMILTON has hereunto set his hand in the presence of two witnesses.

WILLIAM HAMILTON.

Witnesses:
W. BAKEWELL,
M. G. CUSHING.